United States Patent [19]

Matsumura

[11] 4,408,179

[45] Oct. 4, 1983

[54] COMMUNICATIONS SYSTEM FOR AUTOMOTIVE VEHICLES

[75] Inventor: Akira Matsumura, Yokosuka, Japan

[73] Assignee: Nissan Motor Company, Limited, Kanagawa, Japan

[21] Appl. No.: 271,229

[22] Filed: Jun. 8, 1981

Related U.S. Application Data

[62] Division of Ser. No. 133,259, Mar. 24, 1980, Pat. No. 4,359,712.

[30] Foreign Application Priority Data

Mar. 26, 1979 [JP] Japan .................................. 54-35387

[51] Int. Cl.$^3$ ........................ G08G 1/00; G08G 1/12; G08C 21/00
[52] U.S. Cl. ...................................... 340/32; 340/23; 455/33; 455/52; 455/54; 455/99
[58] Field of Search .................... 340/23, 32, 31 R; 455/33, 53, 54, 56, 52, 49, 99, 57, 58, 63

[56] References Cited

U.S. PATENT DOCUMENTS 1,721,574  7/1929  Potter ................................... 455/52
2,745,953  5/1956  Young .................................. 455/54
3,662,267  5/1972  Reed ................................... 455/54

FOREIGN PATENT DOCUMENTS 2614918  10/1977  Fed. Rep. of Germany.

Primary Examiner—James J. Groody

[57] ABSTRACT

A communication system for automotive vehicles includes a fixed unit for transmitting an area signal at all times and information signals when requested and a mobile unit mounted on an automotive vehicle for receiving the area signal when the automotive vehicle passes through a communications area and for then transmitting a request signal to receive the information signals from the fixed unit. Since the electric field strength transmitted from the fixed unit is predetermined to be higher than that transmitted from a mobile unit in the case where two threshold levels for electric field strengths transmitted from both the units are equal to each other, it is possible to maintain a stable communications between both the units, even if electric field strength received by the mobile unit drops for some or other.

2 Claims, 9 Drawing Figures

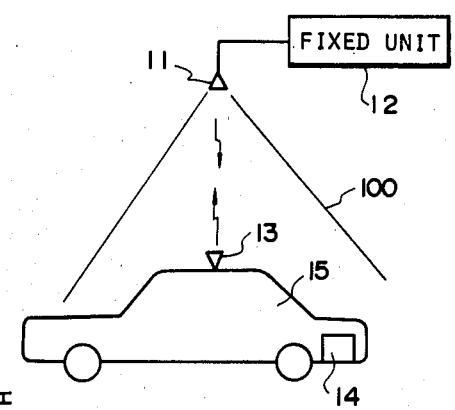
FIG.1
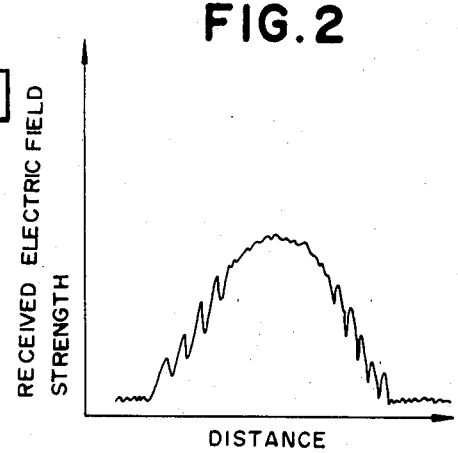
FIG.2
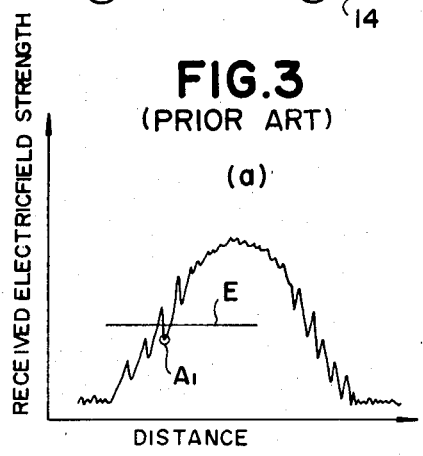
FIG.3 (PRIOR ART)
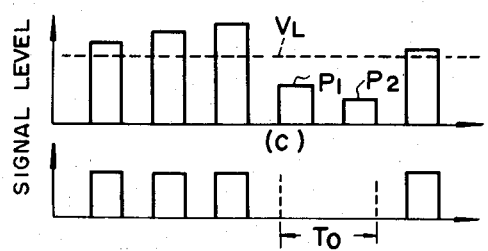
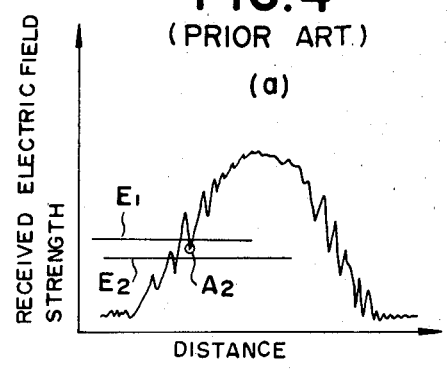
FIG.4 (PRIOR ART)
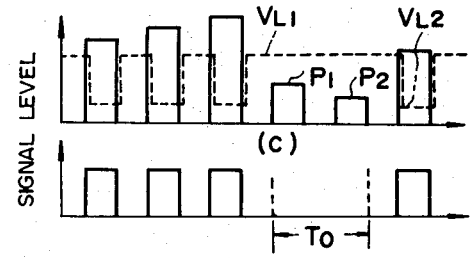

FIG. 5
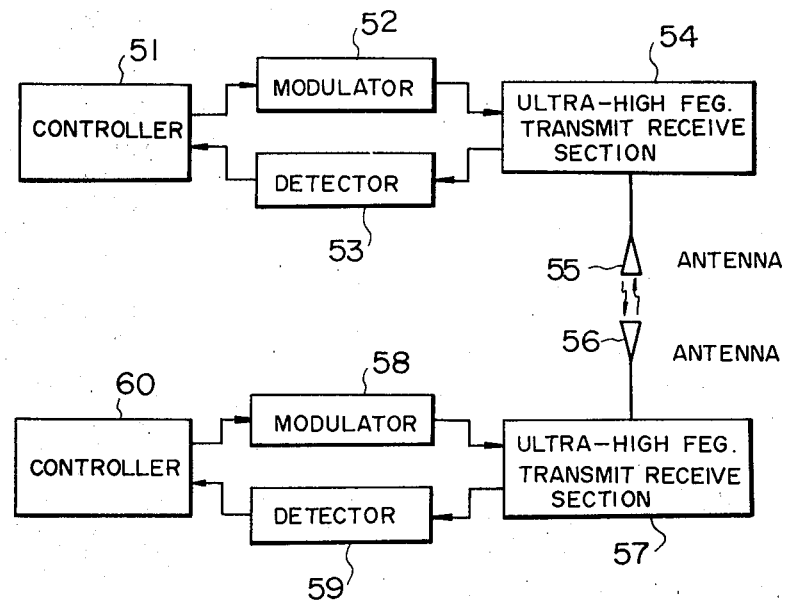
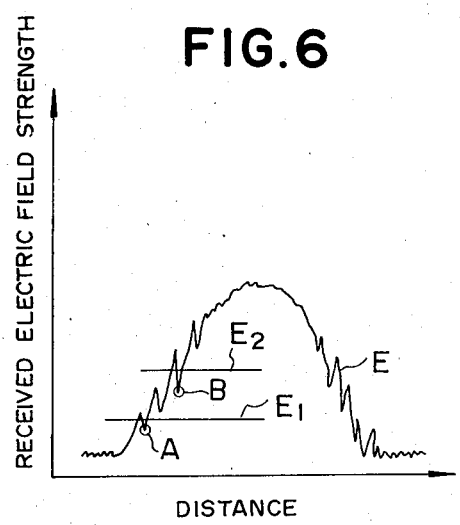
FIG. 6
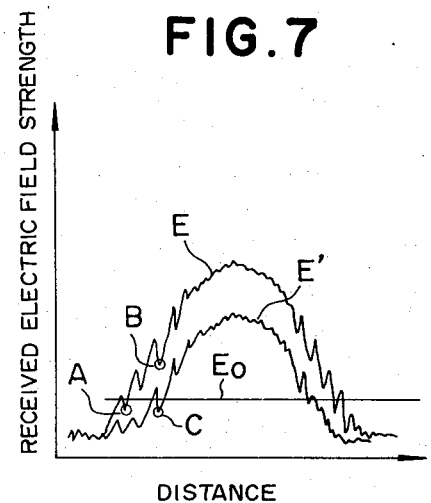
FIG. 7

COMMUNICATIONS SYSTEM FOR AUTOMOTIVE VEHICLES

This is a division of application Ser. No. 133,259 filed Mar. 24, 1980 now U.S. Pat No. 4,359,712.

BACKGROUND OF THE INVENTION

1. Field of the Invention

The present invention relates generally to a communications system for automotive vehicles, and more particularly to a system including a mobile communications unit for communicating with a fixed communications unit which transmits necessary information to the mobile unit whenever an automotive vehicle provided with the mobile unit passes through the area in which it is possible to communicate between the mobile unit and the fixed unit (hereinafter referred to as "communications area," simply).

2. Description of the Prior Art

There is a need for an automotive vehicle to communicate with fixed communications units equipped on appropriate roadside buildings, in order to receive necessary useful information. Therefore, a communications system is necessary between the mobile unit and the fixed unit. In a communications system of this type, a fixed unit fitted on a roadside building transmits an area signal at all times to inform the mobile units on automotive vehicles of the presence of a communications area. When passing through the communications area, a mobile unit on an automotive vehicle receives the area signal and immediately transmits back a request signal to the fixed unit. When receiving the request signal from a mobile unit, the fixed unit begins to transmit back an information signal (possibly corresponding to the request signal) to the mobile unit.

In this communications system, usually, a threshold level for electric field strength transmitted from the fixed unit is predetermined at a constant level in the mobile unit, for the purpose of obtaining a certain fixed minimum S/N ratio.

Although almost constant within a small area, the electric field strength transmitted from the fixed unit is susceptible to change because of the influence of ambient conditions, for example, such as multi-path transmission due to reflections from other vehicles or buildings. That is, drops in the electric field strength readily occur. Thereby, communications is often interrupted between the mobile unit and the fixed unit, even after the fixed unit has begun to transmit information signals.

SUMMARY OF THE INVENTION

Therefore, it is the primary object of the present invention to provide a communications system for automotive vehicles which can receive stable and continuous information signals from a fixed unit, regardless of drops in the electric field strength transmitted from the fixed unit.

With the above and other objects in view, the present invention provides a communications system for automotive vehicles whereby the mobile unit first transmits a request signal to the fixed unit when receiving an area signal from the fixed unit within a communications area and, next, receives the necessary information from the fixed unit after an automotive vehicle provided with the mobile unit further comes nearer to the fixed unit.

For the above purpose, in the present communications system, in the case where electric field strengths transmitted from both mobile and fixed units are equal to each other, a threshold level for the electric field strength transmitted from the mobile unit is set to be higher in the fixed unit than a threshold level for the electric field strength transmitted from the fixed unit set in the mobile unit, so that the time from when the fixed unit receives a request signal from the mobile to when it transmits information signals to the mobile unit is delayed. If the time to transmit the information signals is delayed, during this delay period, since the electric field strength received by the mobile unit generally rises, the mobile unit can receive a stable electric field strength, which is therefore of greater stability and receivability, from the fixed unit. Thus, it is possible to obtain continuous communications between both the units without any interruption, even if drops in the electric field strength received by the mobile unit from the fixed unit occur. In this case, however, it is necessary to predetermine a difference in received electric field strength between both the units larger than any drops in the electric field strength which are likely to occur in practice.

On the other hand, for the same purpose as described above, it is also possible to determine the carrier electric field strength transmitted from the fixed unit to be higher than that transmitted from the mobile unit, in the case where the two threshold levels for electric field strengths transmitted from both the units are equal to each other.

Other objects and features of the invention will become apparent from the following disclosure, taken with the accompanying drawings, and the appended claims.

BRIEF DESCRIPTION OF THE DRAWINGS

The features and advantages of the present invention over the prior-art communications system will be more clearly appreciated from the following description of several preferred embodiments, taken in conjunction with the accompanying drawings, all of which are given for purposes of exemplary explanation only, and are not intended to be limiting of the scope of the invention.

FIG. 1 is a schematic illustration showing a communications system between a fixed communications unit and a mobile communications unit;

FIG. 2 is an illustrative chart showing a typical received electric field strength distribution in the communications area;

FIG. 3(a) is an illustrative chart showing a typical received electric field strength distribution for assistance in explaining a prior-art communications problem state due to a drop in electric field strength;

FIGS. 3(b) and 3(c) are illustrative views showing an interrupted prior-art communications state due to a drop in received signal level;

FIG. 4(a) is an illustrative chart showing another received electric strength distribution for assistance in explaining another prior-art communications state due to a drop in electric field strength, and FIGS. 4(b) and 4(c) are illustrative views showing another interrupted prior-art communications state due to a drop in received signal level;

FIG. 5 is a schematic block diagram showing a first embodiment of the present invention;

FIG. 6 is an illustrative chart showing a received electric field strength distribution for assistance in explaining this first embodiment of the present invention; and FIG. 7 is an illustrative chart showing a received electric field strength distribution for assistance in explaining another embodiment of the present invention.

DETAILED DESCRIPTION OF THE PRIOR ART

The background of the present invention will be particularly explained with respect to its application to an automotive vehicle communications system.

Referring to FIGS. 1 and 2, there is shown the prior-art automotive vehicle communications system.

Communications is carried out between an antenna 11 of a fixed communications unit 12 fitted in a roadside building and an antenna 13 of a mobile communications unit 14 fitted in an automotive vehicle 15, when the automotive vehicle 15 passes within a communications area 100 of the fixed unit 12.

In this prior-art case, the communications system is so designed that the signal transmitted from the fixed unit 12 is received by the mobile unit 14 only when the electric field strength from the fixed unit 12 exceeds a predetermined level in the mobile unit 14 for the purpose of guaranteeing a certain minimum S/N ratio. Although almost constant within a small communications area, the electric field strength transmitted from the fixed unit 12 is susceptible to change while the automotive vehicle is moving because of the influence of ambient conditions, for example, such as multipath transmissions due to reflections from other vehicles or buildings, as shown in FIG. 2. That is, local drops in electric field strength readily occur, and thus the communications is often interrupted between the fixed unit 12 and the mobile unit 14 even after the fixed unit 12 has begun to transmit information signals.

Referring to FIGS. 3(a), (b), and (c), there is shown in detail the influence of drops in received electric field strength. FIG. 3(a) shows a distribution chart of received electric field strength. In this figure, E denotes a threshold level for received electric field strength in the mobile unit, which is determined by a comparator composed of transistor-transistor-logical (TTL) circuits provided in the unit.

FIG. 3(b) shows the sequence of digital signals received by the mobile unit. In this figure, VL denotes a threshold level corresponding to the threshold level E shown in FIG. 3(a). If a drop $A_1$ as shown in FIG. 3(a) occurs in the received electric field strength, since the signal levels of digital signals $P_1$ and $P_2$ shown in FIG. 3(b) drop below the threshold level VL, no usable signal is received during a period of time $T_0$ as shown in FIG. 3(c). In addition, if the signal level is in the vicinity of this threshold level VL, there is a danger of hunting.

In order to prevent this, another possible system is currently used, as shown in FIG. 4. In this case, a comparator composed of TTL circuits with hysteresis characteristics is used to determine an ON level $VL_1$ and an OFF level $VL_2$ of the received signal level. The threshold levels $E_1$ and $E_2$ for received electric field strength shown in FIG. 4(a) correspond to the threshold levels $VL_1$ and $VL_2$ for signal level shown in FIG. 4(b).

In this hysteresis system, the digital signal transmitted from the fixed unit is received by the mobile unit only when the signal level exceeds the ON threshold level $VL_1$, and once the digital signal is received the same signal is kept received until the same digital drops below the OFF threshold level $VL_2$ without hunting. Therefore, in this case, hunting may be prevented with regard to the same digital signal; however, if a drop $A_2$ as in FIG. 4(a) occurs, the next digital signal $P_1$ or $P_2$ is not received during a period of time $T_0$, because the digital signal $P_1$ or $P_2$ does not exceed the ON threshold level $VL_1$.

DETAILED DESCRIPTION OF THE EMBODIMENTS

Referring now to FIGS. 5, 6, and 7, there is shown therein the first preferred embodiment of the present invention.

In FIG. 5, a fixed communication unit is provided with a controller 51, a modulator 52, a detector 53, an ultra-high frequency transmit/receive section 54, and an antenna 55. In the same way as the fixed unit, a mobile communication unit is provided with another antenna 56, another ultra-high frequency transmit/receive section 57, another modulator 58, another detector 59, and another controller 60.

In addition, inside the ultra-high frequency transmit/receive sections 54 and 57, an level detecting means (not shown) such as a comparator is provided in order to detect whether the received electric field strength reaches a predetermined threshold level, so that signals of sufficient received electric field strength only can be detected.

FIG. 6 is an illustrative chart for assistance in explaining the first embodiment of the present invention. In this case, it is assumed that both the fixed communications unit and the mobile communications unit transmit carriers with the same basic electric field strength. The receive/transmit section 57 in the mobile unit is provided, as explained above, with a first level detecting means to detect whether the received electric field strength E reaches the threshold value $E_1$, and the receive/transmit section 54 in the fixed unit is provided with another second level detecting means to detect whether the received electric field strength E reaches the threshold value $E_2$, where $E_2$ is higher than $E_1$. In FIG. 6, the symbol E denotes a typical distribution of electric field strength transmitted from both the units.

If the electric field strength E of an area signal reaches the threshold value $E_1$ of the mobile unit when the automotive vehicle is moving toward the fixed unit, a first receive gate (not shown), incorporating the first level detecting means, in the transmit/receive section 57 in the mobile unit opens, and a series of request signals is transmitted from the mobile unit to the fixed unit, thus responding to the area signal transmitted from the fixed unit. At this point, however, since the electric field strength received by the fixed unit has not yet reached the threshold value $E_2$ of the fixed unit, a second receive gate (not shown), incorporating the second level detecting means, of the transmit/receive section 54 in the fixed unit is not opened. Accordingly, the request signal transmitted from the mobile unit is not acted on by the fixed unit. Therefore, even if a drop A occurs in the electric field strength received by the mobile unit, there will be no problem because an interruption is only introduced in a series of the area signals. So, after the drop A disappears, the mobile unit receives the area signal again, so that the request signal is transmitted again from the mobile unit to the fixed unit. Now, when the automotive vehicle further comes nearer to the fixed unit, the electric field strength E from the mobile unit reaches the threshold value $E_2$ in the fixed unit. As a result the transmit/receive section 54 in the fixed unit opens the second receive gate to receive and act upon the request signal from the mobile unit. At this time, the fixed unit begins to transmit information signals to the mobile unit, thus acting upon the request signal. Therefore, after that, if a certain drop B in the received electric field strength E appears, since the lowest signal value during this drop B is in practice limited so that it is greater than the threshold value $E_1$ of the mobile unit, the first gate in the mobile unit is kept open, and the information signal continues to be received from the fixed unit. In this case, although the electric field strength E drops to B in the fixed unit, the fixed unit is so designed that the information signal is continually transmitted for a given period of time, even if request signals fail. Accordingly, it is possible to provide stable communications without any interruption between the fixed unit and the mobile unit within the communications area. Also, in this case, since the request signal is transmitted repeatedly from the mobile unit to the fixed unit, even if the reception of the information signal is delayed in the mobile unit, there will be no problem.

FIG. 7 explains another embodiment of the present invention. In this case, although the threshold levels $E_0$ of both the units are the same, the electric field strength E transmitted from the fixed unit is predetermined to be greater than that E' transmitted from the mobile unit. That is, the electric field strength E received by the mobile unit is predetermined to be greater than that E' received by the fixed unit. Therefore, when the vehicle comes near to the fixed unit, first the electric field strength E transmitted from the fixed unit reaches the threshold level of the mobile unit to open the first gate of the transmit/receive section 57. Accordingly, the mobile unit begins to act upon the area signal from the fixed unit and thus transmits a request signal to the fixed unit. In this case, even if a drop A (in FIG. 7) occurs for a while in the electric field strength received by the mobile unit, only the reception of the area signal from the fixed unit is interrupted for a while, not the reception of the information signals. Since the area signal is always being transmitted from the fixed unit to the mobile unit, the request signal is continually transmitted from the mobile unit, except when the area signal is interrupted by the drop A. At this time, the second gate in the fixed unit has not opened because the electric field strength transmitted from the mobile unit has always been smaller than the threshold level of the fixed unit. Now, when the vehicle further comes nearer to the fixed unit, if the electric field strength transmitted from the mobile unit reaches the threshold level of the second gate in the fixed unit, the second gate opens so as to act upon the request signal from the mobile unit, and the fixed unit begins to transmit the information signal in accordance with the request signal of the mobile unit. In this case, even if a drop B occurs in the received signal strength, since the drop level is still greater than the threshold level $E_0$ of the mobile unit, the mobile unit can receive the information signal continuously. On the other hand, even if a drop C in the electric field strength received by the fixed unit occurs, since the fixed unit continues to transmit the information signal for a given period of time, even in the event of temporary failure of the request signal, there will be no problem with the interruption of the request signal from the mobile unit. Therefore, in the same way as in the first embodiment shown in FIG. 6, it is possible to provide a stable communications between the mobile unit and the fixed unit, without any interruption.

As particularly described above, according to the present invention, first the first gate of the transmit/receive section of the mobile unit opens to receive the area signal transmitted from the fixed unit, when the vehicle comes within the communications area, and, at this time, the mobile unit begins to transmit a request signal to the fixed unit. After the vehicle further moves toward the fixed unit, next the second gate of the transmit/receive section of the fixed unit opens to receive the request signal from the mobile unit, and, in accordance with the request signal, the fixed unit begins to transmit an information signal to the mobile unit. Therefore, even if a drop occurs in the electric field strength received by the mobile unit, it is possible to communicate between the fixed and mobile unit without interruption.

In addition, the above embodiments have been described by comparing the received electric field strength with the threshold level; however, it is also possible to compare the received signal with the threshold value in another way.

It is further to be understood by those skilled in the art that the foregoing description is of preferred embodiments of the present invention only; and that various changes and modifications may be made without departing from the spirit and scope of the present invention, which should be delimited solely by the appended claims.

What is claimed is:

1. A communications system for automotive vehicles, which comprises:
   (a) a fixed communications unit which transmits an area signal at all times and an information signal if requested; and
   (b) a mobile communications unit which transmits a request signal when the area signal is received within a communications area, and receives the information signal from said fixed unit in accordance with the request signal, the electric field strength transmitted from said fixed communications unit being predetermined higher than that transmitted from said mobile communications unit in the case where the threshold level determined in said fixed communications unit for receiving signals transmitted from said mobile communications unit is equal to the threshold level determined in said mobile communications unit for receiving signals transmitted from said fixed communications unit.

2. A communications system for automotive vehicles as defined in claim 1, wherein:
   (a) said fixed communications unit includes a first ultra-high frequency transmit/receive means for transmitting the area signal to said mobile unit, receiving the request signal from said mobile unit, and transmitting the information signal to said mobile unit, and
   (b) said mobile communications unit includes a second ultra-high frequency transmit/receive means for receiving the area signal from said fixed unit, transmitting the request signal to said fixed unit, and receiving the information signal from said fixed unit.

* * * * *